United States Patent
Bothien et al.

(10) Patent No.: US 8,684,130 B1
(45) Date of Patent: Apr. 1, 2014

(54) DAMPING SYSTEM FOR COMBUSTOR

(71) Applicant: ALSTOM Technology Ltd, Baden (CH)

(72) Inventors: Mirko Ruben Bothien, Zurich (CH); Stephen W. Jorgensen, Palm City, FL (US); Douglas Pennell, Windisch (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/689,926

(22) Filed: Nov. 30, 2012

Related U.S. Application Data

(60) Provisional application No. 61/698,958, filed on Sep. 10, 2012.

(51) Int. Cl.
*F02K 1/00* (2006.01)

(52) U.S. Cl.
USPC .. 181/213; 181/214; 123/184.54; 123/184.57

(58) Field of Classification Search
USPC ............... 181/213, 214; 123/184.53, 184.57
See application file for complete search history.

(56) References Cited

U.S. PATENT DOCUMENTS

| | | | |
|---|---|---|---|
| 6,334,310 B1 | 1/2002 | Sutcu et al. | |
| 6,530,221 B1 * | 3/2003 | Sattinger et al. | 60/725 |
| 7,493,767 B2 * | 2/2009 | Bunker et al. | 60/752 |
| 7,552,796 B2 * | 6/2009 | Baarck et al. | 181/250 |
| 8,025,122 B2 * | 9/2011 | Gilcreest et al. | 181/213 |
| 2004/0248053 A1 | 12/2004 | Benz et al. | |
| 2010/0077761 A1 | 4/2010 | Johnson et al. | |
| 2010/0300116 A1 | 12/2010 | Kaleeswaran et al. | |
| 2011/0220433 A1 * | 9/2011 | Nakamura et al. | 181/213 |
| 2011/0271686 A1 * | 11/2011 | Francisco et al. | 60/783 |
| 2012/0102963 A1 | 5/2012 | Corr et al. | |
| 2012/0180500 A1 | 7/2012 | DiCintio | |

OTHER PUBLICATIONS

European Search Report issued on Oct. 17, 2013 by European Patent Office in corresponding European Patent Application No. 13181701.7.

* cited by examiner

*Primary Examiner* — Forrest M Phillips
(74) *Attorney, Agent, or Firm* — Buchanan Ingersoll & Rooney PC

(57) ABSTRACT

An acoustic damper arrangement for a combustor which has an inner liner configured for use at a first temperature during operation and an outer liner configured for operation at a second temperature lower than the first temperature during operation is disclosed, the acoustic damper arrangement comprising: a plurality of flexible sheets; and at least one hollow body having an interior volume, each of said at least one hollow body being fixed to one of the plurality of flexible sheets, wherein the acoustic damper arrangement is configured to be fixed to both the inner liner and the outer liner such that the interior volume of the at least one hollow body is in communication with a chamber formed by the inner liner, and the plurality of flexible sheets accommodate expansion and contraction of the inner liner relative to the outer liner.

16 Claims, 4 Drawing Sheets

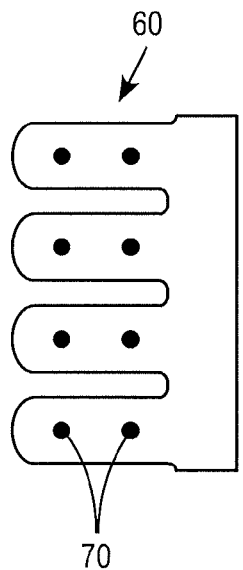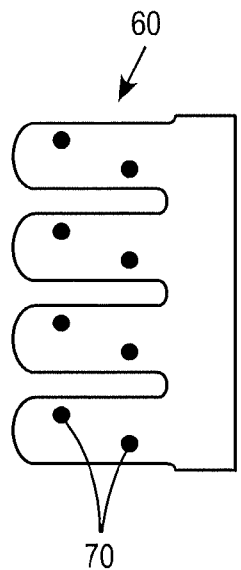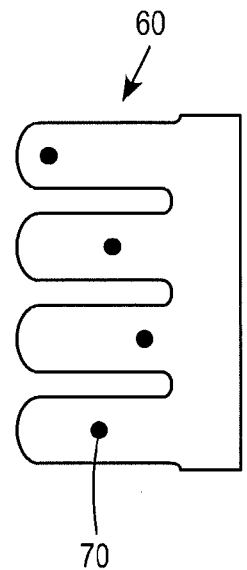
FIG. 4    FIG. 5    FIG. 6
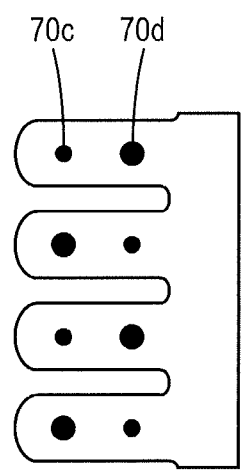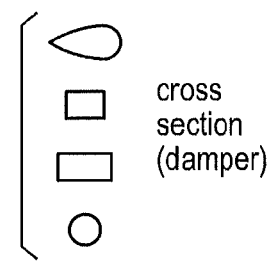
FIG. 7    FIG. 8

DAMPING SYSTEM FOR COMBUSTOR

RELATED APPLICATIONS

The present application claims priority under 35 U.S.C. §119 to U.S. Provisional Patent Application No. 61/698,958, filed Sep. 10, 2012 in the U.S. Patent and Trademark Office, the disclosure of which is hereby incorporated by reference in its entirety.

FIELD

The present disclosure is directed to an acoustic damper arrangement for a combustor, such as a can combustor of a gas turbine.

BACKGROUND INFORMATION

Known can combustors for gas turbines can include an inner liner and an outer liner. At least a portion of air compressed by a compressor part of a gas turbine passes between the inner and outer liners and serves to moderate a temperature of the inner liner. The compressed air can then be intermixed with fuel, and the fuel-air mixture is ignited. This combustion takes place within a space defined by the inner liner.

In some configurations, the inner liner is made of two pieces: an upstream combustion piece and a downstream transition piece. The combustion and transition pieces are connected by an axial seal, such as a hula seal, at the overlap between the pieces. Combustion takes place primarily within the upstream combustion piece, and hot combustion gas is directed by the transition piece to a turbine part of the gas turbine. The combustion and transition piece are thus both directly exposed to the hot combustion gas, except for a section of one of the pieces where they overlap at the hula seal. The temperature difference between the inner and outer liners is less at this location than at other locations because the outer portion of the inner liner at this location is heated less than at other locations. For this reason, it is conventional to fix the inner liner to the outer liner at the location of the hula seal so that a relatively simple connecting structure can be used that is not required to accommodate expansion and contraction of the inner liner relative to the outer liner.

To reduce $NO_x$ emissions during operation, lean premix combustion methods can be used. However, this can increase pressure wave oscillations in the combustor as a result of instabilities in burn rate. Unless properly mitigated, noise and vibration, and possibly damage to the combustors, can result. To address this issue in cannular and annular combustors, an attachment of damper boxes with multiple necks to the transition piece has been proposed, for example, in U.S. Pat. No. 6,530,221 B1, the disclosure of which is incorporated by reference herein in its entirety. A multiple damper version arranged around a can combustor has also been proposed in U.S. Application Publication No. 2011/0220433, the disclosure of which is also incorporated by reference herein in its entirety.

SUMMARY

An acoustic damper arrangement for a combustor which has an inner liner configured for use at a first temperature during operation and an outer liner configured for operation at a second temperature lower than the first temperature during operation is disclosed, the acoustic damper arrangement comprising: a plurality of flexible sheets; and at least one hollow body having an interior volume, each of said at least one hollow body being fixed to one of the plurality of flexible sheets, wherein the acoustic damper arrangement is configured to be fixed to both the inner liner and the outer liner such that the interior volume of the at least one hollow body is in communication with a chamber formed by the inner liner, and the plurality of flexible sheets accommodate expansion and contraction of the inner liner relative to the outer liner.

Also disclosed is a combustor comprising: an inner liner configured for operation at a first temperature; an outer liner configured for operation at a second temperature lower than the first temperature; and an acoustic damper arrangement which connects the inner liner with the outer liner.

BRIEF DESCRIPTION OF THE DRAWINGS

Other features and advantages of the present invention will be apparent from the following description of exemplary embodiments when read in conjunction with the drawings, wherein like elements are assigned like reference numerals, and wherein:

FIGS. 4-7 illustrate exemplary arrangements of flexible sheets and hollow bodies in exemplary acoustic damper arrangements; and FIG. 8 illustrates exemplary cross-sectional shapes of exemplary hollow bodies.

DETAILED DESCRIPTION

Figure 1:
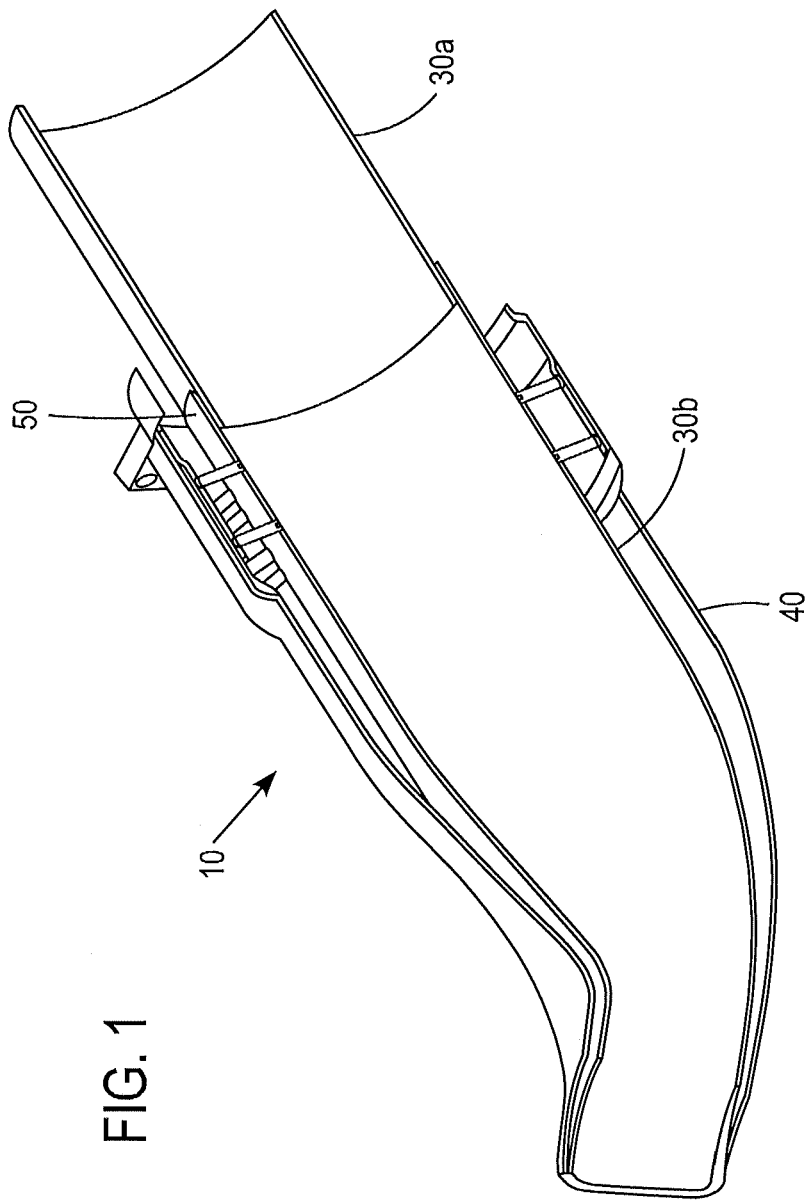
FIG. 1 illustrates a cutaway view of an exemplary combustor.
Figure 2:
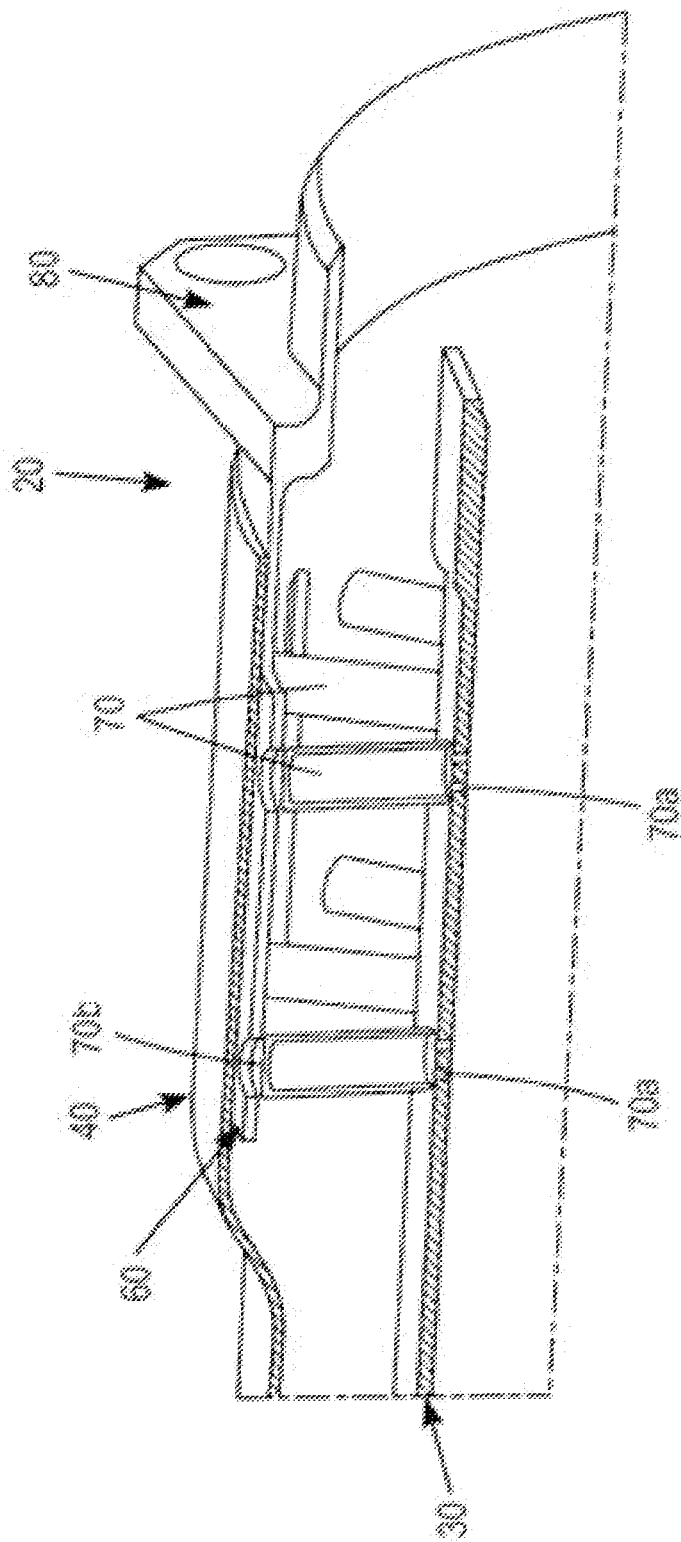
FIG. 2 illustrates a cutaway view of an exemplary acoustic damper arrangement.

FIGS. 1 and 2 illustrate an acoustic damper arrangement 20 for a combustor 10 which has an inner liner 30 configured for use at a first temperature during operation and an outer liner 40 configured for use at a second temperature lower than the first temperature during operation. The acoustic damper arrangement 20 includes a plurality of flexible sheets 60 and at least one hollow body 70 having an interior volume, each of the hollow bodies 70 being fixed to one of the plurality of flexible sheets 60. The acoustic damper arrangement 20 is configured to be fixed to both the inner liner 30 and the outer liner 40 such that the interior volume of the at least one hollow body 70 is in communication with a chamber formed by the inner liner 30, and the plurality of flexible sheets 60 accommodate expansion and contraction of the inner liner 30 relative to the outer liner 40

The plurality of flexible sheets 60 can be fixed at one end thereof to the outer liner 40. At least one hollow body 70 can be fixed to one of the plurality of flexible sheets 60 at a closed end 70b of the hollow body 70. At least one hollow body 70 can have an open end 70a disposed radially inwardly of the closed end 70b and configured to be fixed to the inner liner 30 at least one opening in the inner liner 30. At least one hollow body 70 can be fixed to the one of the plurality of flexible sheets 60 at a surface of the flexible sheet 60 facing the inner liner 30. Multiple such flexible sheets 60, spaced apart in a circumferential direction, can be included.

The one, or more, hollow bodies 70 can possess a cross-sectional shape selected from a group consisting of: a circle, a square, a rectangle, and a teardrop. Of course other suitable shapes can be selected and will be apparent to those skilled in the art. In addition, the hollow bodies 70 can have a same interior volume, or can each possess different interior volumes. A plurality of hollow bodies 70 can be fixed to one of the plurality of flexible sheets 60 at the same or different respective axial or circumferential positions on one of the plurality of flexible sheets 60. Additionally, the number, size and shape of the air channels connecting the interior volumes of the hollow bodies 70 to the chamber defined by the inner liner 30 can be varied.

FIG. 1 illustrates an exemplary combustor 10 which can have an inner liner 30 configured for operation at a first temperature, an outer liner 40 configured for operation at a second temperature lower than the first temperature, and an acoustic damper arrangement 20 which connects the inner liner 30 with the outer liner 40. The combustor inner liner 30 can include a combustion piece 30a, and a transition piece 30b located downstream of the combustion piece 30a relative to a direction of gas flow during operation, with the acoustic damper arrangement 20 being disposed downstream of an overlap between the combustion piece 30a and the transition piece 30b. The combustor 10 can include a fuel injector for injecting fuel into a compressed air flow in the combustor to create an air-fuel mixture, and an igniter for igniting the air-fuel mixture.

In an exemplary embodiment, the space between the inner liner 30 and the outer liner 40 is configured to receive air compressed by a compressor part of a gas turbine. This airflow can help moderate the temperature of the inner liner 30. Within the space defined by the inner liner 30, the compressed air is intermixed with fuel, and the fuel-air mixture is ignited and directed to a turbine part of the gas turbine. Accordingly, the inner liner 30 is configured for use at a higher temperature than the outer liner 40.

Figure 3:
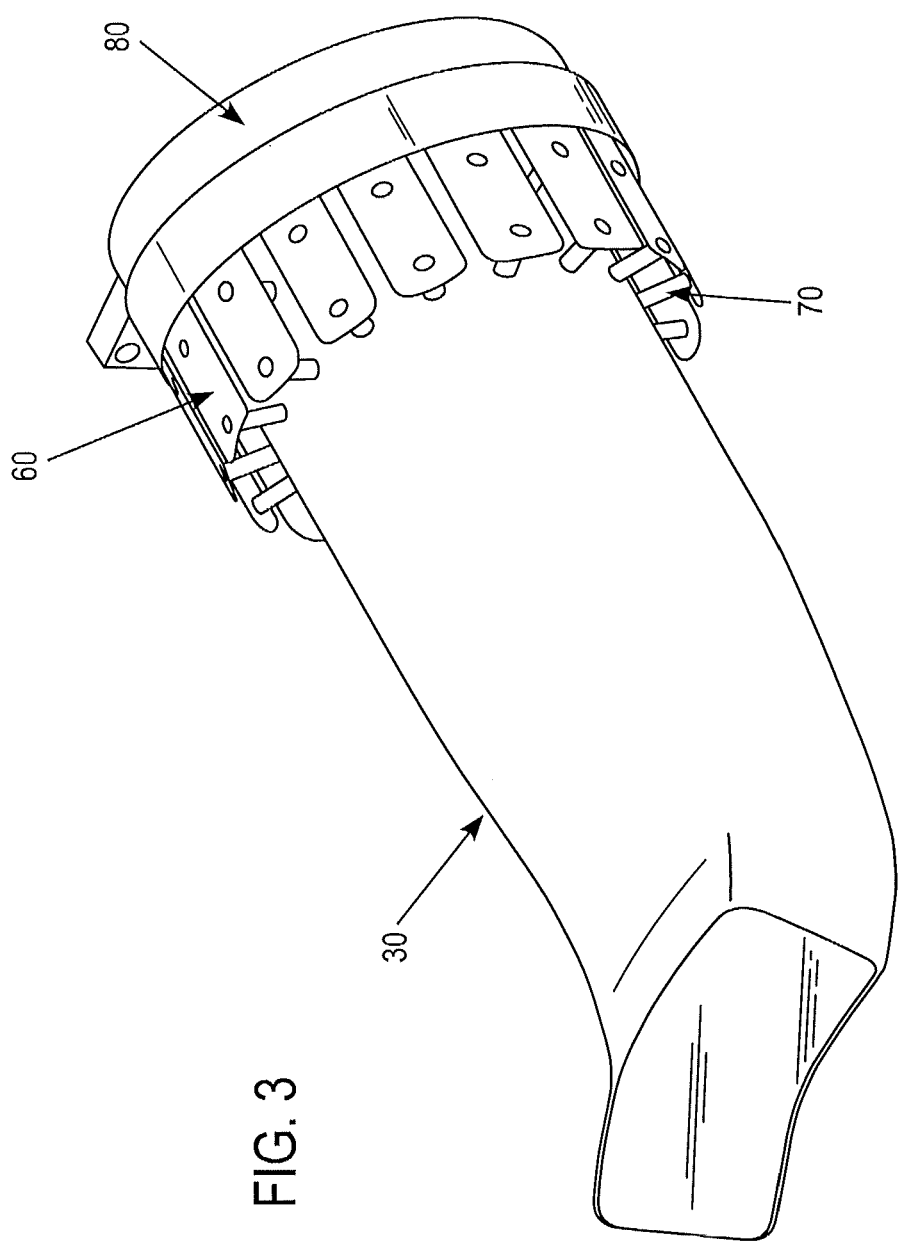
FIG. 3 illustrates a perspective view of an exemplary inner liner transition piece and acoustic damper arrangement.

In an exemplary embodiment of FIGS. 1-3 in which the inner liner 30 is made of the combustion piece 30a and the transition piece 30b downstream of the combustion piece 30a relative to a direction of gas flow during operation, the combustion piece 30a and transition piece 30b are connected at their overlap by an axial seal 50, for example, a hula seal. Combustion can take place primarily within the combustion piece 30a, and hot combustion gas can be directed by the transition piece 30b to the turbine part of the gas turbine. The combustion and transition pieces 30a and 30b can thus both be directly exposed to the hot combustion gas, except for a section of one of the pieces where they overlap at the hula seal 50. The hollow bodies 70 can effectively provide damping volumes and can function as Helmholtz resonators when located downstream of the hula seal 50. With the flexible sheets 60 and hollow bodies 70 being located downstream of the axial seal 50 and thus connecting a hot part of the inner liner 30 with the relatively cool outer liner 40, the flexible sheets 60 can allow for the resulting relative movement during transient operation such as startup, shutdown or load change, during which the operating temperatures can vary. Additionally, the flexible sheets 60 can be formed integrally with the portion of the outer liner 40 that constitutes a ring 80 which provides for fixation of the combustor 10 to the turbine casing.

The hollow bodies 70 provide damping volumes and can function as Helmholtz resonators. FIGS. 4 through 8 illustrate various exemplary shapes of the hollow bodies 70 and arrangements on the flexible sheets 60. For e example, different cross-sectional shapes for the hollow bodies, such as square, rectangle, circle, droplet, can be used, as illustrated in FIG. 8. These shapes and/or the arrangements can be optimized for heat transfer or for minimal flow resistance of the cooling air directed through the space between the inner liner 30 and the outer liner 40, and may be staggered, as illustrated in FIGS. 5 and 6, to minimize pressure loss in the cooling airflow, for example, to minimize the possibility of a wake generated in the cooling airflow. FIG. 7 illustrates that different volumes or opening sizes can be used in the hollow bodies so that, for example, hollow body 70c is optimized for different frequencies than hollow body 70d. For example, high frequency pulsations in a range of approximately 1-10 kHz, as well as low frequency pulsations in a range of approximately 50-500 Hz, can be accounted for. In addition, the provision of the acoustic damper arrangement 20 between the inner and outer liners can eliminate the need for other structure forming a fixed arrangement between the liners.

The resonant frequency of an exemplary hollow body can be calculated by the following formula: $f_{res} = c/2/\pi * \sqrt{(A_{neck}/L_{neck,eff}/V_{damper})}$, where $f_{res}$ is the resonant frequency, c is the speed of sound, $V_{damper}$ is the damping volume, $A_{neck}$ is the cross sectional area of the duct connecting the damping volume to the hot gas duct, and $L_{neck,eff}$ is the effective length of the duct connecting the damping volume to the hot gas duct. In an exemplary embodiment, the neck length is 3-15 mm and the neck diameter is 1-10 mm, although these dimensions could in principle vary.

In an exemplary embodiment, the acoustic damper arrangement is made from high-temperature heat-resistant (Nickel-based) alloys, such as Haynes 230, Haynes 282, Hasteloy X, or Iconel. Also, material combinations are possible, for example, St18-8 for the volume and a higher quality alloy for the neck that is in hot gas contact.

It will be appreciated by those skilled in the art that the present invention can be embodied in other specific forms without departing from the spirit or essential characteristics thereof. The presently disclosed exemplary embodiments are therefore considered in all respects to be illustrative and not restricted.

What is claimed is:

1. An acoustic damper arrangement for a combustor which has an inner liner configured for use at a first temperature during operation and an outer liner configured for operation at a second temperature lower than the first temperature during operation, the acoustic damper arrangement comprising:
   a plurality of flexible sheets; and
   at least one hollow body having an interior volume, each of said at least one hollow body being fixed to one of the plurality of flexible sheets,
   wherein the acoustic damper arrangement is configured to be fixed to both the inner liner and the outer liner such that the interior volume of the at least one hollow body is in communication with a chamber formed by the inner liner, and the plurality of flexible sheets accommodate expansion and contraction of the inner liner relative to the outer liner, and
   wherein the plurality of flexible sheets are configured to be fixed at one end thereof to the outer liner.

2. The acoustic damper arrangement of claim 1, wherein the at least one hollow body is fixed to the one of the plurality of flexible sheets at a closed end of the at least one hollow body.

3. The acoustic damper arrangement of claim 2, wherein the at least one hollow body has an open end disposed radially inward of the closed end and configured to be fixed to the inner liner at least one opening in the inner liner.

4. The acoustic damper arrangement of claim 1, wherein the at least one hollow body is fixed to the one of the plurality of flexible sheets at a surface of the one of the plurality of flexible sheets configured to face the inner liner.

5. The acoustic damper arrangement of claim 1, wherein the at least one hollow body has a cross-sectional shape selected from a group consisting of: a circle, a square, a rectangle, and a teardrop.

6. The acoustic damper arrangement of claim 1, wherein a plurality of hollow bodies are fixed to the one of the plurality of flexible sheets.

7. The acoustic damper arrangement of claim 6, wherein the plurality of hollow bodies have a same interior volume.

8. The acoustic damper arrangement of claim 6, wherein the plurality of hollow bodies have different interior volumes.

9. The acoustic damper arrangement of claim 6, wherein the plurality of hollow bodies are fixed to the one of the plurality of flexible sheets at different respective axial positions on the one of the plurality of flexible sheets.

10. The acoustic damper arrangement of claim 6, wherein the plurality of hollow bodies are fixed to the one of the plurality of flexible sheets at different respective circumferential positions on the one of the plurality of flexible sheets.

11. The acoustic damper arrangement of claim 1, wherein a plurality of hollow bodies are fixed to the plurality of flexible sheets at a same respective circumferential position and a different respective axial position on the plurality of flexible sheets.

12. A combustor, comprising:
 an inner liner configured for operation at a first temperature;
 an outer liner configured for operation at a second temperature lower than the first temperature; and
 an acoustic damper arrangement which connects the inner liner with the outer liner, wherein:
 the acoustic damper arrangement comprises a plurality of flexible sheets and at least one hollow body having an interior volume, each of said at least one hollow body being fixed to one of the plurality of flexible sheets;
 the acoustic damper arrangement is fixed to both the inner liner and the outer liner such that the interior volume of the at least one hollow body is in communication with a chamber formed by the inner liner, and the plurality of flexible sheets accommodate expansion and contraction of the inner liner relative to the outer liner; and
 the plurality of flexible sheets are fixed at one end thereof to the outer liner.

13. The combustor of claim 12, wherein the inner liner comprises:
 a combustion piece; and
 a transition piece located downstream of the combustion piece relative to a direction of gas flow during operation, wherein the acoustic damper arrangement is disposed downstream of an overlap between the combustion piece and the transition piece.

14. The combustor of claim 12, wherein the at least one hollow body is fixed to the one of the plurality of flexible sheets at a closed end of the at least one hollow body.

15. The combustor of claim 12, wherein the at least one hollow body has an open end disposed radially inward of the closed end and fixed to the inner liner at least one opening in the inner liner.

16. The combustor of claim 12, wherein the at least one hollow body is fixed to the one of the plurality of flexible sheets at a surface of the one of the plurality of flexible sheets which faces the inner liner.

\* \* \* \* \*